(12) United States Patent
Sinha

(10) Patent No.: US 6,351,991 B1
(45) Date of Patent: Mar. 5, 2002

(54) DETERMINING STRESS PARAMETERS OF FORMATIONS FROM MULTI-MODE VELOCITY DATA

(75) Inventor: Bikash K. Sinha, West Redding, CT (US)

(73) Assignee: Schlumberger Technology Corporation, Ridgefield, CT (US)

(*) Notice: Subject to any disclaimer, the term of this patent is extended or adjusted under 35 U.S.C. 154(b) by 0 days.

(21) Appl. No.: 09/588,934

(22) Filed: Jun. 5, 2000

(51) Int. Cl.[7] .......................... G01V 1/40; G01V 1/00; G01V 1/28; E21B 49/00
(52) U.S. Cl. .......................... 73/152.01; 73/152.16; 73/597; 73/784; 367/27; 367/31; 367/86; 702/6; 702/11; 702/18
(58) Field of Search ........................ 73/152.01, 152.16, 73/152.47, 783, 784, 804, 597, 587; 367/27, 31, 32, 75, 86, 25; 702/6, 11, 14, 18

(56) References Cited

U.S. PATENT DOCUMENTS

| | | | |
|---|---|---|---|
| 4,635,719 A | 1/1987 | Zoback et al. | 166/250 |
| 4,641,520 A * | 2/1987 | Mao | 73/151 |
| 4,833,914 A | 5/1989 | Rasmus | 73/152 |
| 4,981,037 A | 1/1991 | Holbrook et al. | 73/152 |
| 5,060,203 A * | 10/1991 | Winterstein | 367/75 |
| 5,142,471 A * | 8/1992 | Desbrandes | 364/422 |
| 5,142,501 A * | 8/1992 | Winterstein | 367/75 |
| 5,197,038 A * | 3/1993 | Chang et al. | 367/28 |
| 5,200,929 A | 4/1993 | Bowers | 367/38 |
| 5,398,215 A * | 3/1995 | Sinha et al. | 367/31 |
| 5,475,650 A * | 12/1995 | Sinha et al. | 367/31 |
| 5,544,127 A * | 8/1996 | Winkler | 367/27 |
| 5,615,115 A | 3/1997 | Shilling | 364/421 |
| 5,619,475 A * | 4/1997 | Winkler | 367/27 |
| 5,838,633 A * | 11/1998 | Sinha | 367/31 |
| 5,859,367 A | 1/1999 | Holbrook | 73/152.05 |
| 5,965,810 A | 10/1999 | Holbrook | 73/152.05 |
| 6,098,021 A * | 8/2000 | Tang | 702/14 |
| 6,192,316 B1 * | 2/2001 | Hornby | 702/6 |

OTHER PUBLICATIONS

Biot, M.A. "Mechanics of Deformation and Acoustic Propagation in Porous Media". *Journal of Applied Physics*, vol. 33, No. 4 (Apr. 1962) pp. 1482–1498.

(List continued on next page.)

*Primary Examiner*—Hezron Williams
*Assistant Examiner*—David J. Wiggins
(74) *Attorney, Agent, or Firm*—William B. Batzer; John L. Lee

(57) ABSTRACT

A method for determining unknown stress parameters in earth formation measures velocities in four sonic transmissions modes (compression, fast shear, slow shear and Stoneley) at a series of depths. Relationships between measured velocities and other measured values, two independent linear constants, and three nonlinear constants associated with equations of motion for pre-stressed isotropic materials are expressed in a set of four or five velocity difference equations derived from non-linear continuum mechanics. The velocity difference equations are solved using inversion for useful stress parameters, including maximum horizontal stress, minimum horizontal stress, pore pressure, and change in pore pressure over time.

15 Claims, 5 Drawing Sheets

OTHER PUBLICATIONS

Bowers, G.L. "Pore Pressure Estimation From Velocity Data: Accounting for Overpressure Mechanisms Besides Undercompaction". IADC/SPE 27488. *1994 IADC/SPE Drilling Conference held in Dallas, TX,* (Feb. 15–18, 1994) pp. 515–530.

Fertl, W.H. and Chilingarian, G.V. "Importance of Abnormal Formation Pressures". *Journal of Petroleum Technology* (Apr. 1977) pp. 347–354.

Eaton, Ben A. "The Effect of Overburden Stress on Geopressure Prediction from Well Logs". *Journal of Petroleum Technology* (Aug. 1972) pp. 929–934.

Eaton, Ben A. "The Equation for Geopressure Prediction from Well Logs", $50^{th}$ Annual Fall Meeting of Society of Petroleum Engineers of AIME, Dallas, Texas (Sep. 29–Oct. 1, 1975) Paper No. SPE 5544.

Hsu, K. et al. "Interpretation and Analysis of Sonic–While–Drilling Data in Overpressured Formations". SPWLA $38^{th}$ Annual Logging Symposium (Jun. 15–18, 1997).

Hsu, Kai et al. "Sonic–While–Drilling Tool Detects Overpressured Formations". *Oil & Gas Journal* (Aug. 4, 1997) pp. 59–67.

Hsu, K. et al. "Case Studies of Time–Lapse Sonic Logging". *SPWLA $39^{th}$ Annual Logging Symposium* (May 26–29, 1998).

Hottmann, C.E. et al. "Estimation of Formation Pressures from Log–Derived Shale Properties". *Journal of Petroleum Technology* (Jun. 1965) pp. 717–722.

Kimball, Christopher V. and Marzetta, Thomas L. "Semblance Processing of Borehole Acoustic Array Data". *Geophysics,* vol. 49, No. 3 (Mar. 1984) pp. 274–281.

Matthews, W.R. and Kelly, John. "How to Predict Formation Pressure and Fracture Gradient". *The Oil and Gas Journal* (Feb. 20, 1967) pp. 92–106.

Norris, Andrew N. et al. "Acoustoelasticity of Solid/Fluid Composite Systems". *Geophysics J. Int.* 118 (1994) pp. 439–446.

Sinha, Bikash K. and Kostek, Sergio. "Stress–Induced Azimuthal Anisotropy in Borehole Flexural Waves". *Geophysics.* vol. 61, No. 6 (Nov–Dec. 1996) pp. 1899–1907.

Thurston, R.N. and Brugger, K. "Third–Order Elastic Constants and the Velocity of Small Amplitude Elastic Waves in Homogeneously Stressed Media". Physical Review, vol. 133, No. 6A (Mar. 16, 1964) pp. A1604–A1610.

Mueller, Michael C. et al. "Case Studies of the Dipole Shear Anisotropy Log". $64^{th}$ Annual International Meeting, Soc. Expl. Geophys., Expanded Abstracts (1994) pp. 1143–1146.

Esmersoy, Cengiz et al. "Dipole Shear Anisotropy Logging". $64^{th}$ Annual International Meeting, Soc. Expl. Geophys., Expanded Abstracts (1994) pp. 1139–1142.

Harrison, A.R., et al. "Acquisition and Analysis of Sonic Waveforms From a Borehole Monopole and Dipole Source for the Determination of Compressional and Shear Speeds and Their Relation to Rock Mechanical Properties and Surface Seismic Data". Society of Petroleum Engineers Annual Technical Conference and Exhibition, New Orleans, (Sep. 23–26, 1990) SPE Paper No. 20557, pp. 267–282.

Aron, J. et al. "Real–Time Sonic Logging While Drilling in Hard and Soft Rocks". SPWLA $38^{th}$ Annual Logging Symposium (Jun. 15–18, 1997).

Foster, J. B. and Whalen, H.E., "Estimation of Formation Pressures From Electrical Surveys—Offshore Louisiana". *Journal of Petroleum Technology* (Feb. 1966) pp. 165–171.

Scott, David and Thomsen, L.A. "A Global Algorithm for Pore Pressure Prediction". Society of Petroleum Engineers Middle East Oil Technical Conference & Exhibition, Bahrain (Apr. 3–6, 1993) SPE Paper No. 25674, pp. 645–654.

* cited by examiner

DETERMINING STRESS PARAMETERS OF FORMATIONS FROM MULTI-MODE VELOCITY DATA

TECHNICAL FIELD

The present invention relates to methods for determining stress parameters from sonic velocity measurements in an earth formation around a borehole.

BACKGROUND OF THE INVENTION

Formation stresses play an important role in geophysical prospecting and development of oil and gas reservoirs. Knowledge of both the direction and magnitude of these stresses is required to ensure borehole stability during directional drilling, to facilitate hydraulic fracturing for enhanced production, and to facilitate selective perforation for prevention of sanding during production. A detailed knowledge of formation stresses also helps producers manage reservoirs that are prone to subsidence caused by a significant reduction in pore fluid pressure (herein referred to as "pore pressure") and an associated increase in the effective stress that exceeds the in-situ rock strength.

The formation stress state is characterized by the magnitude and direction of the three principal stresses. Generally, the overburden stress yields the principal stress in the vertical direction. The overburden stress ($S_V$) is reliably obtained by integrating the formation mass density from the surface to the depth of interest. Accordingly, to fully characterize the formation stress state, it is necessary to determine the two principal stresses in the horizontal plane maximum and minimum horizontal stresses, $S_{H\,max}$ and $S_{h\,min}$, respectively.

Existing techniques for estimating the maximum and minimum horizontal stresses are based on analyzing borehole breakouts and borehole pressure necessary to fracture the surrounding formation, respectively. Both borehole break-outs and hydraulic fracturing are destructive techniques that rely on assumed failure models. For example, a borehole breakout analysis can be used only in the presence of a compressive-shear failure and assumed cohesive strength and friction angle in the Mohr-Coulomb failure envelope (Gough and Bell, 1982; Zoback et al., 1985). The hydraulic fracturing technique for the estimation of $S_{H\,max}$ requires a reliable knowledge of the rock in-situ tensile strength that is difficult to obtain.

Hydraulic Fracturing and Wellbore Breakouts

The standard technique for determining in-situ formation stresses is based on hydraulic fracturing of surrounding formation between a sealed-off interval in a borehole. The technique includes applying increasing hydraulic pressure in the sealed-off interval to produce a radial fracture. The rock fractures when the circumferential stress produced by pressure and borehole-induced stress concentrations exceeds the tensile strength of rock. The effective circumferential (or hoop) stress at the borehole surface for an elastic deformation of a nonporous and impermeable formation is given by (Vernik and Zoback, 1992)

$$\sigma_{\theta\theta}=(S_{H\,max}+S_{h\,min})-2\cos 2\theta(S_{H\,max}-S_{h\,min})-P_w, \quad (1)$$

where $\theta$ is the angle measured from the $S_{H\,max}$ direction; and $P_W$ is the wellbore pressure. Hydraulic fracturing applies a tensile failure model at $\theta=0°$ and $180°$, and wellbore breakouts uses a compressive-shear failure model at $\theta=90°$ and $270°$ for the estimation of maximum and minimum horizontal stresses in the far-field. Hubbert and Willis proposed that if $P_b$ were the breakdown or fracture pressure in the borehole, the relationship between the maximum and minimum horizontal stresses is given by $$S_{H\,max}=3S_{h\,min}-P_b-P_p+T_o, \quad (2)$$

where $T_o$ is the tensile strength at the borehole surface, $P_P$ is the formation pore pressure, and it is assumed that there is no fluid injection into the formation. This expression yields an upper bound on the breakdown pressure. If fluid injection occurs (i.e. mud penetrates the formation), there is a reduction in the breakdown pressure magnitude. In the presence of any plastic deformation at the borehole surface or borehole wall cooling during drilling (Moos and Zoback, 1990), the hoop stress at the borehole surface is appreciably reduced and this results in an overestimate of the maximum horizontal stress $S_{H\,max}$ magnitude.

Minimum horizontal stress $S_{h\,min}$ can be determined more reliably using hydraulic fracturing and a method proposed by Roegiers. After the fracture has propagated for a while, the hydraulic pumps are stopped and an instantaneous shut-in pressure is recorded. This pressure is only slightly above the minimum principal stress—assuming the influence of borehole to be negligibly small. Therefore, the instantaneous shut-in pressure is taken to be the minimum horizontal stress $S_{h\,min}$ (Roegiers, 1989).

After the formation has bled off, a second cycle of pressurization is started with the same pressurizing fluid and the same pumping rate as the first cycle. The pressure required to re-open the fractures, $P_{reopen}$ is recorded and subtracted from the breakdown pressure $P_b$, to yield the tensile strength $T_o$. However, estimation of the tensile strength is not very reliable.

Vernik and Zoback (1992) have shown from core analysis that there is a significant tensile and compressive strength anisotropy in rocks. They have suggested the use of an effective strength in the failure model used in the estimation of the maximum horizontal stress $S_{H\,max}$ magnitude from the wellbore breakout analysis. The $S_{H\,max}$ can be estimated from the following equation $$S_{H\,max} = \frac{C_{ef} + P_w}{1 - 2\cos(\pi - 2\phi_b)} - S_{h\,min}\frac{1 + 2\cos(\pi - 2\phi_b)}{1 - 2\cos(\pi - 2\phi_b)}, \quad (3)$$

where $2\phi_b$ is the breakout width, and $P_W$ is the wellbore pressure. This equation is derived from the effective stress with $2\theta=\pi/2-\phi_b$, and $C_{ef}$ is the effective compressive strength of the formation near the borehole surface.

Pore Pressure in Over-Pressured Formations

Existing techniques for determining pore pressure in an overpressured formation attempt to account for the potential source of pore pressure increase in terms of undercompaction (resulting in an increase in porosity) and/or pore fluid expansion caused by a variety of geological processes (Eaton, 1975; Bowers, 1994). Eaton (1975) proposed an empirical relationship between the measured compressional velocity V and the effective stress $\sigma$ $$V=V_o+C\sigma^{1/3} \quad (4)$$

where the empirical parameter C is obtained by fitting the velocity-effective stress data in a normally compacted zone. Below the top of overpressure in the velocity reversal zone, using the same empirical parameter C and the exponent ⅓ may lead to an underestimate of the pore pressure increase. Bower (U.S. Pat. No. 5,200,929, Apr. 6, 1993) has proposed to remedy the limitation of the Eaton's technique by assuming two different empirical relations between the measured compressional velocity and effective stress. These two different relations in a normally compacted and velocity-reversal zones are constructed to account for the undercompaction and pore-fluid expansion (that may be caused by temperature changes, hydrocarbon maturation, and clay diagenesis). Bower (SPE 27488, 1994) has proposed the following relationship between the measured compressional velocity and effective stress a in a normally compacted zone (also referred to as the virgin curve)

$$V=V_o+A\sigma^B \quad (5)$$

where $V_o$ is the velocity at the beginning of the normal compaction zone; A and B are the empirical parameters obtained from velocity-effective stress data in a nearby offset well. The velocity-effective stress in a velocity-reversal zone attributable to a fluid-expansion effect and an associated hysteretic response is described by $$V=V_o+A[\sigma_{MAX}(\sigma/\sigma MAX)^{1/U}]^B \quad (6)$$

where A and B are the same as before, but U is a third parameter to be determined from the measured data in a nearby offset well. $\sigma_{MAX}$ is defined by $$\sigma_{MAX} = \left(\frac{V_{MAX} - V_0}{A}\right)^{1/B} \quad (7)$$

where $\sigma_{MAX}$ and $V_{MAX}$ are estimates of the effective stress and velocity at the onset of unloading.

Both Eaton's and Bowers's techniques define the effective stress $\sigma=S_v-P_p$, where $S_V$ is the overburden stress, and $P_P$ is the pore pressure in both the normally compacted and overpressured zones (implying that the Biot parameter $\alpha=0$).

Existing techniques for the detection of overpressured (shale) formations include analyzing a formation resistivity, rate of (drill-bit) penetration, and compressional velocity logs that can be measured while drilling (Hottman and Johnson, 1965; Bowers, 1995). A rapid decrease in formation resistivity, a rapid increase in the rate of penetration, and a rapid decrease in the compressional velocity at a certain depth are indicators of the top of overpressured shale or formation. These indicators are useful for the driller for maintaining wellbore stability by a proper adjustment of the mud weight that avoids borehole breakouts or tensile fractions leading to a significant mud loss. There is a need in the industry for a reliable estimate of the magnitude of the pore pressure increase in the overpressured formation.

SUMMARY OF THE INVENTION

The present invention provides a method for determining an unknown stress parameter of an earth formation within a selected depth interval proximate to a borehole.

A first embodiment includes measuring a first set of parameters of the formation within a selected depth interval to produce a first set of measured values. The first set of parameters includes compressional velocity, fast-shear velocity, slow-shear velocity and Stoneley velocity. The first embodiment also includes estimating a second set of parameters of the formation to produce estimated values. It also includes solving a set of first, second, third, and fourth velocity difference equations by executing a least squares minimization program to determine the unknown stress parameter using the measured values and the estimated values. The first equation includes a compressional velocity term, the second equation includes a fast-shear velocity term, the third equation includes a slow-shear velocity term, and the fourth equation includes a Stoneley velocity term. The first embodiment also includes solving a fifth equation to determine to determine the specific unknown stress parameter at a given depth within the depth interval.

A first version of the first embodiment includes solving a fifth equation to determine total maximum horizontal stress at the given depth. In this version the fifth equation contains the Biot parameter to correct for porosity, pore shape and connectivity.

A second version of the first embodiment includes solving a fifth equation to determine total minimum horizontal stress at the given depth. In this version, as in the first version, the fifth equation includes the Biot parameter to correct for porosity, pore shape and connectivity.

A third version of the first embodiment includes solving a fifth equation to determine pore pressure gradient at the given depth. In this version the fifth equation includes dividing pore pressure difference across the selected depth interval by the depth of the depth interval.

A fourth version of the first embodiment determines minimum horizontal stress gradient by inversion of velocity difference equations using estimates of overburden stress, pore pressure, and maximum horizontal stress gradient.

A fifth version of the first embodiment determines pore pressure gradient by inversion of velocity difference equations using estimates of overburden stress, maximum horizontal stress gradient, and minimum horizontal stress gradient.

A second embodiment provides a method for determining the difference in pore pressure at a given depth in an earth formation proximate to a borehole, before and after a production period. The method of the second embodiment includes measuring a first set of parameters of the formation within a selected depth interval of the borehole before and after the production period to produce a first and second set of measured values, respectively. The set of parameters includes one velocity of a group of velocities, the group consisting of compressional velocity, fast-shear velocity and slow-shear velocity. The method of the second embodiment also includes estimating a second set of parameters of the formation to produce estimated values. It further includes solving at least one velocity difference equation to determine the unknown stress parameter at a depth within the depth interval using the first and second sets of measured values and the estimated values. It further includes solving another equation involving linear and non-linear stress coefficients to determine difference in pore pressure.

A first version of the second embodiment uses measured compressional velocity values.

A second version of the second embodiment uses measured fast-shear velocity values.

A third version of the second embodiment uses measured slow-shear velocity values.

A third embodiment provides a method for determining pore fluid overpressure in an overpressured shale formation.

DETAILED DESCRIPTION OF THE INVENTION

General

In a first embodiment, the method of the present invention determines a formation stress parameter by inversion of differences in the compressional, fast-shear, slow-shear, and Stoneley velocities. Formation stress parameters include maximum horizontal stress, minimum horizontal stress, pore pressure and vertical stress.

Figure 1:
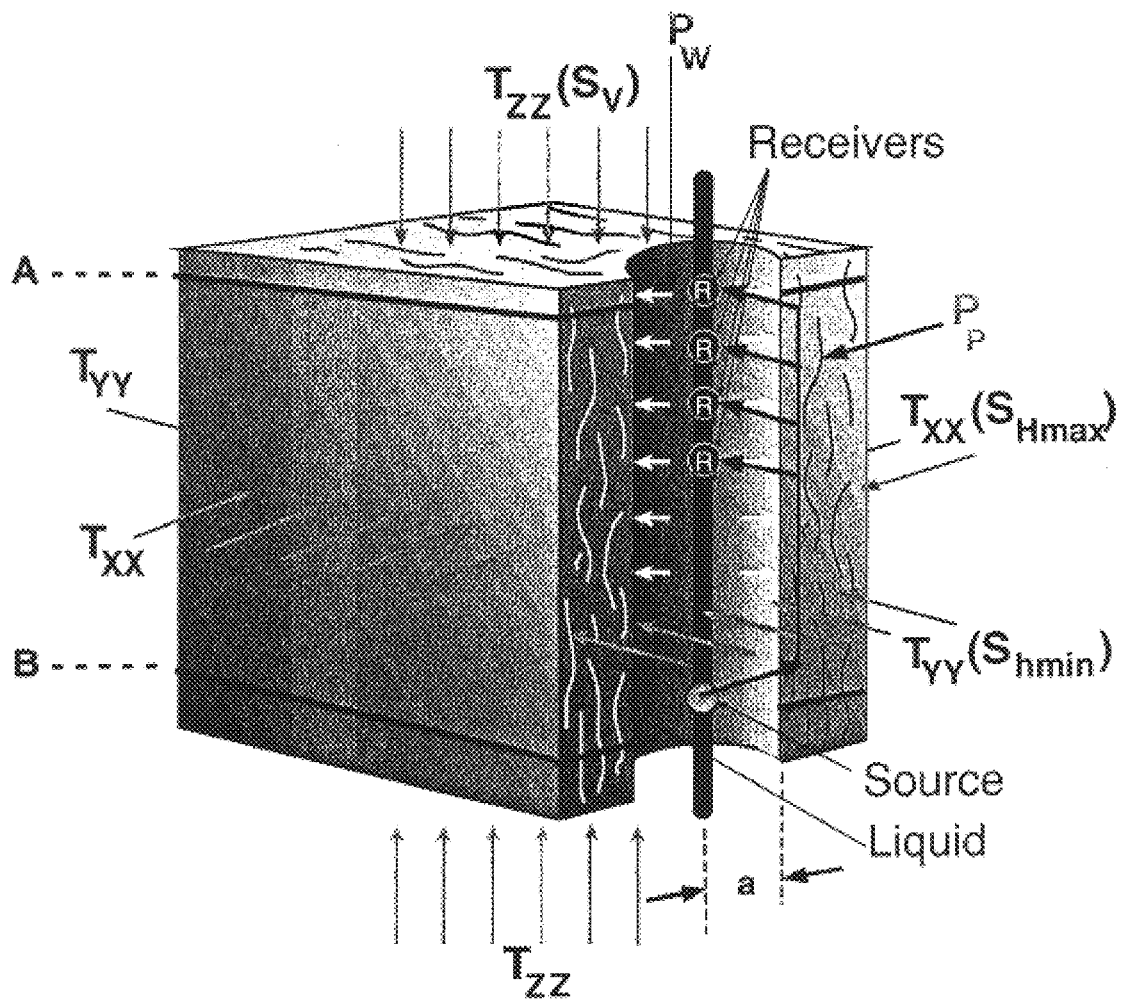
FIG. 1 is a schematic representation of formation rock around borehole, also showing of stresses in the rock, a sonic transmitter, a set of sonic receivers, and a depth interval AB.

Apparatus used to obtain velocity data includes a sonic transmitter and a set of sonic receivers. These are shown schematically in FIG. 1, which also shows formation rock around borehole, stresses in the rock, and a depth interval AB. Note that the dimensions in FIG. 1 are not to scale. The distance between the transmitter and the first receiver is typically 9–11 feet, and the distance between the transmitter and the far receiver is typically 15 feet. However, the distance A–B is usually much greater, typically within the range 50–200 feet. Depth interval AB should correspond to a uniform lithology, i.e. all the same rock type within the depth interval.

The method is based on a velocity difference model including a set of four velocity difference equations, one equation for each of the four sonic transmission modes. The velocity difference equations are derived from non-linear continuum mechanics. The model defines relationships between measured velocities, other measured values (mass density and depth), and two independent linear constants (selected from Young's modulus, Poisson's ratio and two Lame constants). The first embodiment of the method determines formation stress parameters by solving the four velocity difference equations using a computer program to perform inversion of velocity difference equations. The four velocity difference equations relate the velocity differences to the three formation nonlinear stiffness constants and a vertical depth gradient of maximum horizontal stress magnitude. Overburden stress, pore pressure, and minimum horizontal stress gradients obtained from other sources are input to the model. Useful stress parameters determined by the method of the present invention include maximum horizontal stress, minimum horizontal stress and pore pressure. The same method may be used to determine change in pore pressure over time.

In the first embodiment the method determines formation stress parameters by solving the four velocity difference equations to determine four unknown quantities. In preferred versions of the first embodiment, the four unknown quantities are the three formation nonlinear constants associated with equations of motion for pre-stressed isotropic materials, and another quantity associated with the particular parameter to be determined. After determining the four unknown quantities by inversion of the four difference equations, a fifth equation is used to calculate the particular parameter to be determined.

A first version of the first embodiment is a procedure for determining maximum horizontal stress gradient $\Delta S_{H\ max}$ using inversion of velocity difference equations and estimates of overburden stress, minimum horizontal stress gradient, and pore pressure.

A second version of the first embodiment is a procedure for determining minimum horizontal stress gradient $\Delta S_{h\ min}$ using inversion of velocity difference equations and estimates of overburden stress, pore pressure, and maximum horizontal stress gradient.

A third version of the first embodiment is a procedure for determining pore pressure gradient $\Delta P_p$ using inversion of velocity difference equations and estimates of overburden stress, maximum horizontal stress gradient, and minimum horizontal stress gradient.

In the second embodiment change in pore pressure after a period of hydrocarbon production is determined by solving the four velocity difference equations to determine formation nonlinear constants at the beginning and end of the period. A change in the reservoir pore pressure is calculated from time-lapse measurements of the compressional and shear velocities in the far-field before and after hydrocarbon production. The inversion model parameters (formation nonlinear constants) are obtained from changes in the velocities as a function of depth at the beginning of production. These model parameters together with the changes in velocities at a selected depth yield the change in the reservoir pore pressure.

The third embodiment determines pore fluid overpressure of an overpressured shale formation at a given depth in an earth formation proximate to a borehole. An increase in the pore pressure in an overpressured shale formation from that in a normally compacted zone is calculated from the compressional (and/or shear) velocity measured as a function of depth. The compressional velocity increases linearly in a normally compacted zone and shows a rapid decrease in an overpressured zone. The vertical effective stress coefficient of compressional velocity is obtained from the velocity and pore pressure gradients in a normally compacted zone. Under the assumptions that the lithology and lateral stresses are approximately the same (or known from other sources) over the depth interval of interest, one can estimate the increase in the pore pressure from the decrease in the compressional velocity at a given depth provided the Biot parameter in both the normally compacted and overpressured zones are known from other sources.

Model for Determination of Stress Parameters in a Formation around a Borehole

The model on which the present invention is based includes equations for stress magnitudes from sonic logs, elastic wave propagation in a borehole, and effective stresses and the Biot parameter.

Stress Magnitudes from Sonic Logs

The present invention provides a nondestructive technique based on standard borehole sonic measurements that can be used to estimate the in-situ horizontal stresses together with formation nonlinear parameters. This technique neither requires the presence of a wellbore failure in the form of a breakout or fractures, nor the in-situ rock tensile and compressive strengths. This technique is based on changes in velocities of multiple sonic waves caused by changes in prestress in the propagating medium. In addition, we make use of sonic velocities outside any altered annulus where borehole-induced stress concentrations and plastic deformation might occur.

The propagation of small amplitude waves in homogeneous and anisotropic materials is described by the linear equations of motion. However, when the material is prestressed, the propagation of such waves is properly described by equations of motion for small dynamic fields superposed on a static bias. A static bias represents any statically deformed state of the medium due to an externally applied load or residual stresses. The equations of motion for small dynamic fields superposed on a static bias are derived from the rotationally invariant equations of nonlinear elasticity (Sinha, 1982; Norris et al., 1992). The linear equations of motion for isotropic materials contain two independent stiffnesses that are defined by the Young's modulus (Y) and Poisson's ratio ($\upsilon$) or equivalently, by the two Lame parameters, ($\lambda$ and $\mu$). The equations of motion for pre-stressed isotropic materials contain three additional nonlinear stiffness constants ($C_{111}, C_{144}$, and $C_{155}$).

Elastic Wave Propagation in a Borehole

An acoustic source in a fluid-filled borehole generates headwaves as well as relatively stronger borehole-guided modes. A standard sonic measurement system consists of placing a piezoelectric source and hydro-phone receivers inside a fluid-filled borehole as shown in FIG. 1. The piezoelectric source is configured in the form of either a monopole or a dipole source. The source bandwidth typically ranges from 0.5 to 20 kHz. A monopole source generates primarily the lowest-order axisymmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. These refracted along the borehole surface are known as compressional headwaves. The critical incidence angle $\theta_i = \sin^{-1}(V_f/V_c)$ where $V_f$ is the compressional wave speed in the borehole fluid; and $V_c$ is the compressional wave speed in the formation. As the compressional headwave travels along the interface, it radiates energy back into the fluid that can be detected by hydro-phone receivers placed in the fluid-filled borehole. In fast formations, the shear headwave in the borehole fluid can be similarly excited by a compressional wave at the critical incidence angle $\theta_i = \sin^{-1}(V_f/V_s)$ where $V_s$ is the shear wave speed in the formation. It is also worth noting that headwaves are excited only when the wavelength of the incident wave is smaller than the borehole diameter so that the boundary can be effectively treated as a planar interface. In a homogeneous and isotropic model of fast formations, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array recorded dipole waveforms.

Consider a vertical fluid-filled borehole with its axis parallel to the $X_3$-direction, and the maximum and minimum horizontal stresses parallel to the $X_1$- and $X_2$-directions, respectively. The presence of triaxial formation stresses with a vertical overburden stress as one of the principal stresses introduces stress-induced anisotropy that can be approximated by an equivalent orthorhombic anisotropy. Referred to the statically deformed configuration of the prestressed formation, the plane wave velocities in the far-field (away from the stress-induced altered annulus) are given by $$\rho V_{33}^2 = \lambda + 2\mu + T_{33} + (\lambda + 2\mu)(3E_{33} - E_{11} - E_{22}) + C_{111}(E_{11} + E_{22} + E_{33}) - 4C_{155}(E_{11} + E_{22}) \quad (8)$$

$$\rho V_{31}^2 = \mu + T_{33} + \mu(E_{11} + E_{33} - E_{22}) + C_{144}E_{22} + C_{155}(E_{11} + E_{33}), \quad (9)$$

$$\rho V_{31}^2 = \mu + T_{33} + \mu(E_{22} + E_{33} - E_{11}) + C_{144}E_{11} + C_{155}(E_{22} + E_{33}), \quad (10)$$

where $V_{IJ}$ denotes the plane wave velocity for propagation along the $X_I$-direction and polarization along the $X_J$-direction; $\rho$ is the mass density in the statically deformed state; $\lambda$ and $\mu$ are the formation linear constants referred to a chosen isotropic reference state; $C_{111}, C_{144},$ and $C_{155}$ are the three nonlinear constants referred to the chosen isotropic reference state; and $T_{11}, T_{22},$ and $T_{33}$ are the incremental effective stresses above and beyond those in the reference state $E_{11}, E_{22},$ and $E_{33}$ are the corresponding principal strains that are related to the principal stresses by the following equations $$E_{11} = \frac{T_{11}}{Y} - \frac{\upsilon(T_{22} + T_{33})}{Y}, \quad (11)$$

$$E_{22} = \frac{T_{22}}{Y} - \frac{\upsilon(T_{33} + T_{11})}{Y}, \quad (12)$$

$$E_{33} = \frac{T_{33}}{Y} - \frac{\upsilon(T_{22} + T_{11})}{Y}, \quad (13)$$

where the Young's modulus Y and Poisson's ratio $\upsilon$ can be expressed in terms of the compressional and shear velocities by the following equations $$Y = \rho V_s^2 \frac{[3(V_P/V_S)^2 - 4]}{[(V_P/V_S)^2 - 1]}, \quad (14)$$

$$\upsilon = \frac{1}{2} \frac{[(V_P/V_S)^2 - 2]}{[(V_P/V_S)^2 - 1]}, \quad (15)$$

where $\rho$ is the mass density of the formation at a given depth.

The incremental change in the effective stiffnesses caused by a corresponding change in the formation stresses are given by $$\Delta C_{33} = \Delta T_{33} + C_{33}(3\Delta E_{33} - \Delta E_{11} - \Delta E_{22}) + C_{111}(\Delta E_{11} + \Delta E_{22} + \Delta E_{33}) - 4C_{155}(\Delta E_{11} + \Delta E_{22}), \quad (16)$$

$$\Delta C_{44} = \Delta T_{33} + C_{44}(\Delta E_{11} + \Delta E_{33} - \Delta E_{22}) + C_{144}\Delta E_{22} + C_{155}(\Delta E_{11} + \Delta E_{33}) \quad (17)$$

$$\Delta C_{55} = \Delta T_{33} + C_{55}(\Delta E_{22} + \Delta E_{33} - \Delta E_{11}) + C_{144}\Delta E_{11} + C_{155}(\Delta E_{22} + \Delta E_{33}) \quad (18)$$

The lowest-order axisymmetric Stoneley mode is a dispersive mode whose low-frequency asymptote coincides with the tube wave speed. Closed-form expression for the tube wave speed in anisotropic formations is of value in inverting for a certain 2 0 combination of formation stress parameters. The tube wave velocity $V_T$ for a Stoneley mode propagating along the $X_3$-axis can be expressed in terms of an effective shear modulus in the $X_1$-$X_2$ plane perpendicular to the borehole axis $$V_T = V_f \left(1 + \frac{\rho_f V_f^2}{C_{66}}\right)^{-1/2}, \quad (19)$$

where $C_{66}$ is the effective shear modulus in the horizontal plane.

The velocities of plane shear waves propagating along the $X_1$- and $X_2$-directions in a triaxially stressed formation are given by $$\rho V_{12}^2 = C_{66} + T_{11} + C_{66}(E_{11} + E_{22} - E_{33}) + C_{144}E_{33} + C_{155}(E_{11} + E_{22}), \quad (20)$$

$$\rho V_{21}^2 = C_{66} + T_{22} + C_{66}(E_{11} + E_{22} - E_{33}) + C_{144}E_{33} + C_{155}(E_{11} + E_{22}), \quad (21)$$

We define an effective increase in the shear modulus caused by the incremental formation stresses above and beyond those present in the chosen reference state by the following equation $$\Delta C_{66} = \frac{1}{2}(\Delta T_{11} + \Delta T_{22}) + C_{66}(\Delta E_{11} + \Delta E_{22} - \Delta E_{33}) + C_{144}\Delta E_{33} + C_{155}(\Delta E_{11} + \Delta E_{22}), \quad (22)$$

Effective Stresses and the BIOT Parameter

Elastic wave velocities in porous materials change as a function of effective stresses in the propagating medium. These effective stresses $T_{ij}$ are defined by (Nur and Byerlee, 1971)

$$T_{ij} = S_{ij} - \alpha \delta_{ij} P_p, \quad (23)$$

where $\delta_{ij}$ is the Kronecker delta and the Biot parameter $\alpha$ is given by $$\alpha = 1 - \frac{K}{K_S}, \quad (24)$$

where K is the bulk modulus of the dry aggregate and $K_S$ is the intrinsic bulk modulus of the solid matrix. Even though the porosity effect is not explicit in this expression, it is included in the value of the effective bulk modulus K of the dry aggregate. In the case of a nonporous and impermeable formation, $K \approx K_S$, and $\alpha \approx 0$. In contrast, in natural soils, $K << K_s$, and $\alpha \approx 1$. In porous rocks, the Biot parameter is affected by both the porosity, pore shape, and connectivity (Walsh, 1965). Generally, $\phi < \alpha < 1$, in porous rocks with porosity $\phi$. More importantly, the Biot parameter $\alpha_n$ in a normally compacted shale formation with open pores is typically more than that in an overpressured ($\alpha_o$) shale with larger effective porosity and closed pores, i.e., $\alpha_n > \alpha$.

Figure 2:
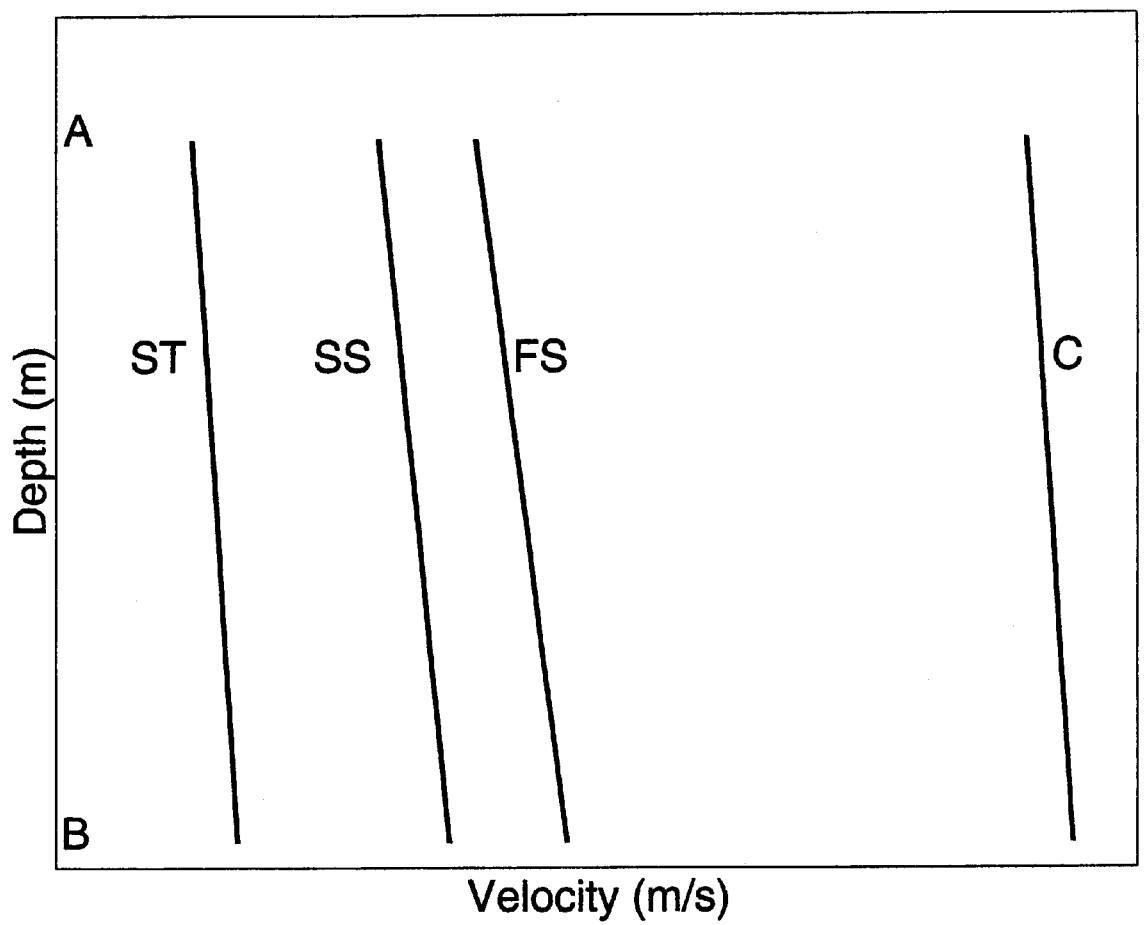
FIG. 2 is a graph showing compressional, Stoneley, fast shear, and slow shear velocities as a function of depth.

Method for Determining Stress Parameters in a Formation around a Borehole Determining Maximum Horizontal Stress The first version of the first embodiment of the method is a procedure for determining maximum horizontal stress magnitude $S_{H\ max}$ using inversion of velocity difference equations. FIG. 1 is a schematic representation of formation rock around borehole, also showing stresses in the rock, a sonic transmitter, a set of sonic receivers, and a depth interval AB. FIG. 2 is a graph showing compressional, fast shear, slow shear, and Stoneley velocities as a function of depth in the depth interval AB. "A" indicates the top of the depth interval. "B" indicates the bottom of the depth interval. In the first embodiment, the method includes the following steps:

1. Selecting a depth interval AB of the borehole.
2. Calculating the overburden stress difference $\Delta S_V$ over the depth interval AB by integrating formation mass density using equation $$\Delta S_V = \int_B^A \rho_b g dh, \quad (25)$$

where $\rho_b$ is the formation bulk density and g is the acceleration due to gravity.

3. Calculating effective vertical stress difference $\Delta \sigma_V$ using the equation $$\Delta \sigma_v = \Delta S_V - \alpha \Delta P_P, \quad (26)$$

where $\alpha$ is the Biot parameter for a porous formation, and $\Delta P_P$ is the pore pressure difference over the selected depth interval AB.

4. Estimating effective minimum horizontal stress change $\Delta \sigma_h$ over the selected depth interval AB using minimum horizontal stress change $S_h$ determined from hydrofrac tests in neighboring offset wells, and using the equation $$\Delta \sigma_h = \Delta S_h - \alpha \Delta P_P. \quad (27)$$

5. Solving a set of first, second, third and fourth velocity difference equations to determine maximum horizontal stress.

Solving the velocity difference equations includes inserting into the equations (a) estimated values of vertical stress, pore pressure, and minimum horizontal stress, (b) estimated values of linear constants (two independent linear constants selected from Young's modulus, Poisson's ratio and the two Lame constants), (c) measured values of two physical parameters (depth and mass density), and (d) measured values of compressional, fast shear, slow shear, and Stoneley velocities between the depths A and B. It also includes solving the set of velocity difference equations by inversion.

Equations 28–31 below are combined with equations 32–35 to eliminate $\Delta C_{33}$, $\Delta C_{44}$, $\Delta C_{55}$ and $\Delta C_{66}$ to produce the velocity difference equations. The resulting velocity difference equations are solved by inversion for effective maximum horizontal stress $\Delta \sigma_H$. The equations are solved for the four unknowns: $\Delta \sigma_H$, $C_{111}$, $C_{144}$, and $C_{155}$. Note that $\Delta \sigma_H$ is the difference between the effective maximum horizontal stress at depth B and the effective maximum horizontal stress at depth A. The equations are solved using a commercially available computer program configured to execute a least squares minimization program. The computer program "fmins" (a MATLAB® program provided by The MathWorks, Inc., 24 Prime Park Way, Natick, Mass. 01760) can be used to solve the four velocity-difference equations for the four unknowns of interest. "MATLAB" is a registered trademark of The MathWorks, Inc.

Equations 28–31 express the four effective stiffnesses $C_{33}$, $C_{55}$ and $C_{66}$ (for compressional, fast shear, slow shear and Stoneley waves, respectively) in terms of velocity differences as follows $$\Delta C_{33} = \rho_B V^2_{C,B} - \rho_A V^2_{C,A}, \quad (28)$$

$$\Delta C_{44} = \rho_B V^2_{SS,B} - \rho_A V^2_{SS,A}, \quad (29)$$

$$\Delta C_{55} = \rho_B V^2_{FS,B} - \rho_A V^2_{FS,A}, \quad (30)$$

$$\Delta C_{66} = \frac{\rho_{f,B} V^2_{f,B}}{(V^2_{f,B}/V^2_{ST,B} - 1)} - \frac{\rho_{f,A} V^2_{f,A}}{(V^2_{f,A}/V^2_{ST,A} - 1)}, \quad (31)$$

where $\rho_A$ and $\rho_B$ are the formation mass density at depths A and B, respectively; $\rho_{f,A}$ and $\rho_{f,B}$ are the mud density at depths A and B, respectively. $V_C$, $V_{Fs}$, $V_{ss}$ and $V_{ST}$, are the compressional, fast shear, slow shear and Stoneley velocities, respectively.

Equations 32–35 express the four above-mentioned effective stiffnesses $\Delta C_{33}$, $\Delta C_{44}$, $\Delta C_{55}$ and $\Delta C_{66}$ in terms of changes in the effective vertical stress ($\Delta \sigma_V$) maximum horizontal stress ($\Delta \sigma H$), minimum horizontal stress ($\Delta \sigma_h$), and the three independent formation nonlinear constants $C_{111}$, $C_{144}$, and $C_{155}$ as follows $$\Delta C_{33} = \left[1 + \frac{(3+2\upsilon)(\lambda+2\mu)}{Y}\right]\Delta\sigma_V - \quad (32)$$
$$\frac{(1+2\upsilon)(\lambda+2\mu)}{Y}(\Delta\sigma_H + \Delta\sigma_h) +$$
$$\frac{C_{111}}{\mu}\left[\frac{(1-2\upsilon)\mu}{Y}(\Delta\sigma_H + \Delta\sigma_h) + \frac{(1-2\upsilon)\mu}{Y}\cdot\Delta\sigma_V\right] -$$
$$4\frac{C_{155}}{\mu}\left[\frac{(1-\upsilon)\mu}{Y}(\Delta\sigma_H + \Delta\sigma_h) - \frac{2\upsilon\mu}{Y}\cdot\Delta\sigma_V\right],$$

$$\Delta C_{44} = \left(1 + \frac{\mu}{Y}\right)\Delta\sigma_V + \frac{\mu}{Y}\Delta\sigma_h - \frac{(1+2\upsilon)\mu}{Y}\Delta\sigma_H + \quad (33)$$
$$\frac{C_{144}}{\mu}\left[\frac{\mu}{Y}\Delta\sigma_H - \frac{\upsilon\mu}{Y}(\Delta\sigma_h + \Delta\sigma_V)\right] +$$
$$\frac{C_{155}}{\mu}\left[-\frac{2\upsilon\mu}{Y}\Delta\sigma_H + \frac{(1-\upsilon)\mu}{Y}(\Delta\sigma_h + \Delta\sigma_V)\right],$$

$$\Delta C_{55} = \left(1 + \frac{\mu}{Y}\right)\Delta\sigma_V + \frac{\mu}{Y}\Delta\sigma_H - \frac{(1+2\upsilon)}{Y}\Delta\sigma_h + \quad (34)$$
$$\frac{C_{144}}{\mu}\left[\frac{\mu}{Y}\Delta\sigma_h - \frac{\upsilon\mu}{Y}(\Delta\sigma_H + \Delta\sigma_V)\right] +$$
$$\frac{C_{155}}{\mu}\left[-\frac{2\upsilon\mu}{Y}\Delta\sigma_h + \frac{(1-\upsilon)\mu}{Y}(\Delta\sigma_H + \Delta\sigma_V)\right],$$

$$\Delta C_{66} = \left(\frac{1}{2} + \frac{\mu}{Y}\right)(\Delta\sigma_H + \Delta\sigma_h) - \frac{(1+2\upsilon)\mu}{Y}\cdot\Delta\sigma_V + \quad (35)$$
$$\frac{C_{144}}{\mu}\left[\frac{\mu}{Y}\Delta\sigma_V + \frac{-\upsilon\mu}{Y}(\Delta\sigma_H + \Delta\sigma_h)\right] +$$
$$\frac{C_{155}}{\mu}\left[-\frac{2\upsilon\mu}{Y}\Delta\sigma_V + \frac{(1-\upsilon)\mu}{Y}(\Delta\sigma_H + \Delta\sigma_h)\right],$$

where Y, $\upsilon$ and $\mu$ are the Young's modulus, Poisson's ratio, and shear modulus of the formation referred to a selected isotropic reference state at the initial depth A.

5a. Solving the velocity difference equations includes estimating shear modulus p in the reference state from the measured Stoneley velocity value at the initial depth $\mu$ using the equation $$\mu = \frac{\rho_{f,A}V_{f,A}^2}{V_{f,A}^2/V_{ST,A}^2 - 1}, \quad (36)$$

where $\rho_{f,A}$ is the mud density at depth A; and $V_{f,A}$, and $V_{ST,A}$ are the mud compressional velocity and Stoneley velocity at depth A, respectively.

5b. Solving the velocity difference equations includes estimating compressional modulus ($\lambda+2\mu$) from the formation compressional velocity at depth A using the equation $$\lambda+2\mu=\sigma_{b,A}V_{c,A}^2. \quad (37)$$

5c. Solving the velocity difference equations includes calculating Young's modulus and Poisson's ratio from the Lame parameters ($\lambda$ and $\mu$) or the compressional and shear velocities in the chosen isotropic reference state.

5d. Solving the velocity difference equations includes estimating effective vertical stress $\Delta\sigma_V$ from the overburden stress, pore pressure gradient, and the Biot parameter $\alpha$.

5e. Solving the velocity difference equations includes estimating effective minimum horizontal stress $\Delta_{\sigma h}$ from the hydrofrac tests, pore pressure gradient and the Biot parameter.

6. Solving for maximum horizontal stress at a given depth A within the selected depth interval includes calculating effective maximum horizontal stress at depth A using the equation $$\sigma_{H,A} = \frac{\rho_{b,A}(V_{FS,A}^2 - V_{SS,A}^2)}{(1-\upsilon)(2\mu+C_{155}-C_{144})/Y} + \sigma_{h,A}, \quad (38)$$

and calculating the total maximum horizontal stress using the equation $$S_{H,A}=\sigma_{H,A}+\alpha P_{P,A}, \quad (39)$$

where $P_{P,A}$ the pore pressure at depth A, and $\alpha$ is the Biot parameter.

Figure 3:
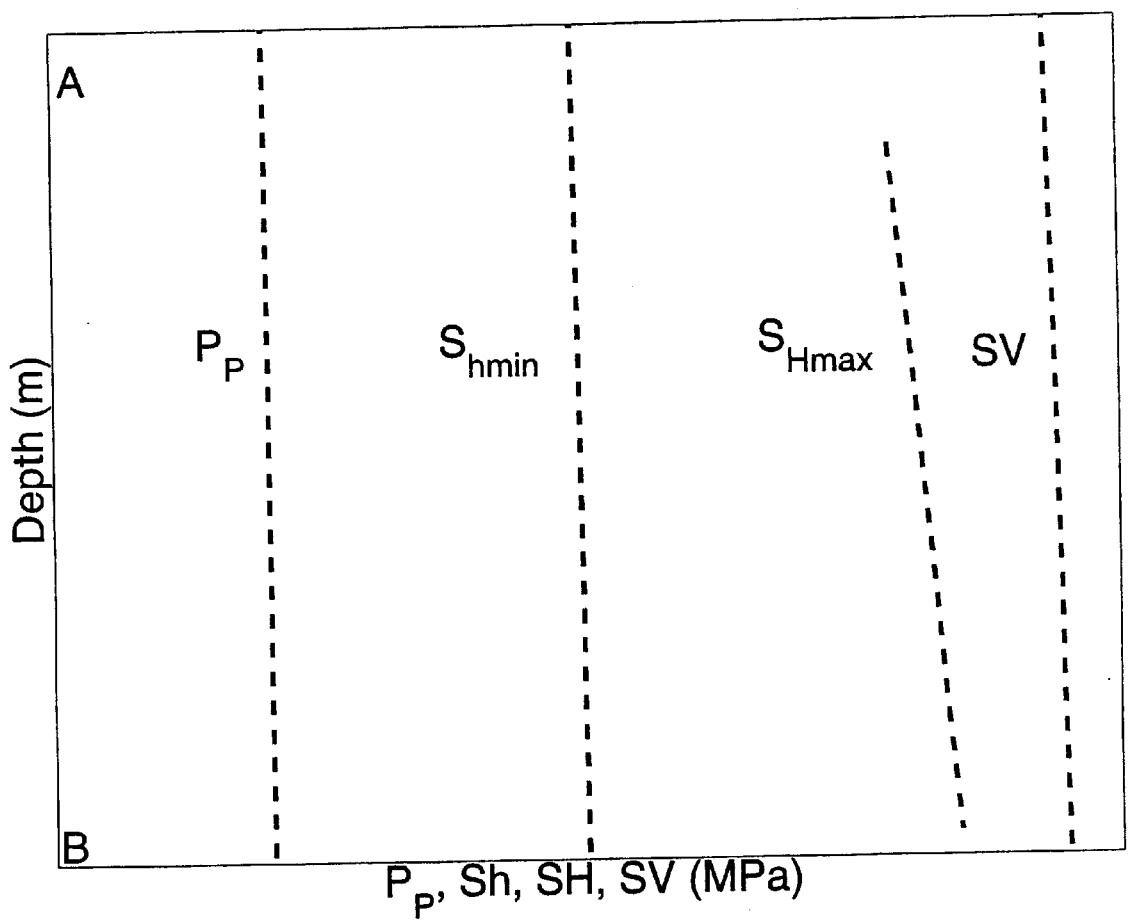
FIG. 3 is a graph showing pore pressure, minimum horizontal stress, maximum horizontal stress, and overburden stress as a function of depth.

FIG. 3 is a plot of $V_{f,A}$, $S_V$, $S_{H\ max}$, and $S_{h\ min}$ stress magnitudes as a function of depth in a selected depth interval with uniform lithology. This stress system ($S_V > S_{H\ max} > S_{h\ min}$) is referred to as a normal fault stress regime.

Determining, Minimum Horizontal Stress

The second version of the first embodiment of the method is a procedure for determining minimum horizontal stress magnitude $S_{h\ min}$ using inversion of velocity difference equations. In the second embodiment, the method includes the following steps:

1. Selecting a depth interval AB of the borehole as illustrated in FIG. 1. "A" indicates the top of the depth interval. "B" indicates the bottom of the depth interval.

2. Calculating the overburden stress difference $\Delta S_V$ over the depth interval AB by integrating formation mass density using equation $$\Delta S_V = \int_B^A \rho_b g dh, \quad (40)$$

where $\rho_b$ is the formation bulk density and g is the acceleration due to gravity.

3. Calculating effective vertical stress difference $\Delta\sigma_v$ using the equation $$\Delta\sigma_v = \Delta S_v - \alpha\Delta P_P, \quad (41)$$

where $\alpha$ is the Biot parameter for a porous formation, and $\Delta P_P$ is the pore pressure difference over the selected depth interval AB.

4. Estimating effective maximum horizontal stress change $\Delta\sigma_v$ over the selected depth interval AB using maximum horizontal stress change $S_H$ determined from hydrofrac tests or wellbore breakouts in neighboring offset wells, and using the equation $$\Delta\sigma_H = \Delta S_H - \alpha\Delta P_P. \quad (42)$$

5. Solving the set of first, second, third and fourth velocity difference equations to determine minimum horizontal stress.

Solving velocity difference equations includes inserting into the equations (a) estimated values of vertical stress, pore pressure, and maximum horizontal stress, (b) estimated values of linear constants (two independent linear constants selected from Young's modulus, Poisson's ratio and the two Lame constants), (c) measured values of two physical parameters (depth and mass density), and (d) measured values of compressional, fast shear, slow shear, and Stoneley velocities between the depths A and B. It also includes solving the set of velocity difference equations by inversion.

Equations 43–46 below are combined with equations 47–50 to eliminate $\Delta C_{33}$, $\Delta C_{44}$, $\Delta C_{55}$ and $\Delta C_{66}$ to produce the velocity difference equations. The resulting velocity difference equations are solved by inversion for effective minimum horizontal stress $\Delta\sigma_h$. The equations are solved for the four unknowns: $\Delta\sigma_h$, $C_{111}$, $C_{144}$, and $C_{155}$. Note that $\Delta\sigma_h$ is the difference between the effective minimum horizontal stress at depth B and the effective minimum horizontal stress at depth A. The equations are solved using a commercially available computer program configured to execute a least squares minimization program. (A suitable program is named herein above).

Equations 43–46 express the four effective stiffnesses $\Delta_{33}$, $\Delta C_{44}$, $\Delta C_{55}$ and $\Delta C_{66}$ (for compressional, fast shear, slow shear and Stoneley waves, respectively) in terms of velocity difference as follows $$C_{33} = \rho_B V^2_{C,B} - \rho_A V^2_{C,A}, \tag{43}$$

$$C_{44} = \rho_B V^2_{SS,B} - \rho_A V^2_{SS,A}, \tag{44}$$

$$C_{55} = \rho_B V^2_{FS,B} - \rho_A V^2_{FS,A}, \tag{45}$$

$$\Delta C_{66} = \frac{\rho_{f,B} V^2_{f,B}}{(V^2_{f,B}/V^2_{ST,B} - 1)} - \frac{\rho_{f,A} V^2_{f,A}}{(V^2_{f,A}/V^2_{ST,A} - 1)}, \tag{46}$$

where $\rho_A$ and $\rho_B$ are the formation mass density at depths A and B, respectively; $\rho_{f,A}$ and $\rho_{f,B}$ are the mud density at depths A and B, respectively. $V_C$, $V_{FS}$, $V_{SS}$ and $V_{ST}$ are the compressional, fast shear, slow shear and Stoneley velocities, respectively.

Equations 47–50 express the four above-mentioned effective stiffnesses $\Delta C_{33}$, $\Delta C_{44}$, $\Delta C_{55}$ and $\Delta C_{66}$ in terms of changes in the effective vertical stress ($\Delta\sigma_V$), maximum horizontal stress ($\Delta\sigma_H$), minimum horizontal stress ($\Delta\sigma_h$), and the three independent formation nonlinear constants $C_{111}$, $C_{144}$ and $C_{155}$ as follows $$\Delta C_{33} = \left[1 + \frac{(3 + 2\nu)(\lambda + 2\mu)}{Y}\right]\Delta\sigma_V - \frac{(1 + 2\nu)(\lambda + 2\mu)}{Y}(\Delta\sigma_H + \Delta\sigma_h) + \frac{C_{111}}{\mu}\left[\frac{(1 - 2\nu)\mu}{Y}(\Delta\sigma_H + \Delta\sigma_h) + \frac{(1 - 2\nu)\mu}{Y}\cdot\Delta\sigma_V\right] - 4\frac{C_{155}}{\mu}\left[\frac{(1 - \nu)\mu}{Y}(\Delta\sigma_H + \Delta\sigma_h) - \frac{2\nu\mu}{Y}\cdot\Delta\sigma_V\right], \tag{47}$$

$$\Delta C_{44} = \left(1 + \frac{\mu}{Y}\right)\Delta\sigma_V + \frac{\mu}{Y}\Delta\sigma_h - \frac{(1 + 2\nu)\mu}{Y}\Delta\sigma_H + \frac{C_{144}}{\mu}\left[\frac{\mu}{Y}\Delta\sigma_H - \frac{\nu\mu}{Y}(\Delta\sigma_h + \Delta\sigma_V)\right] + \frac{C_{155}}{\mu}\left[-\frac{2\nu\mu}{Y}\Delta\sigma_H + \frac{(1 - \nu)\mu}{Y}(\Delta\sigma_h + \Delta\sigma_V)\right], \tag{48}$$

$$\Delta C_{55} = \left(1 + \frac{\mu}{Y}\right)\Delta\sigma_V + \frac{\mu}{Y}\Delta\sigma_H - \frac{(1 + 2\nu)}{Y}\Delta\sigma_h + \frac{C_{144}}{\mu}\left[\frac{\mu}{Y}\Delta\sigma_h - \frac{\nu\mu}{Y}(\Delta\sigma_H + \Delta\sigma_V)\right] + \frac{C_{155}}{\mu}\left[-\frac{2\nu\mu}{Y}\Delta\sigma_h + \frac{(1 - \nu)\mu}{Y}(\Delta\sigma_H + \Delta\sigma_V)\right], \tag{49}$$

$$\Delta C_{66} = \left(\frac{1}{2} + \frac{\mu}{Y}\right)(\Delta\sigma_H + \Delta\sigma_h) - \frac{(1 + 2\nu)\mu}{Y}\cdot\Delta\sigma_V + \frac{C_{144}}{\mu}\left[\frac{\mu}{Y}\Delta\sigma_V + \frac{-\nu\mu}{Y}(\Delta\sigma_H + \Delta\sigma_h)\right] + \frac{C_{155}}{\mu}\left[-\frac{2\nu\mu}{Y}\Delta\sigma_V + \frac{(1 - \nu)\mu}{Y}(\Delta\sigma_H + \Delta\sigma_h)\right], \tag{50}$$

where Y, $\nu$ and $\mu$ are the Young's modulus, Poisson's ratio, and shear modulus of the formation referred to a selected isotropic reference state at the initial depth A.

5a. Solving the velocity difference equations includes estimating shear modulus $\mu$ in the reference state from the measured Stoneley velocity value at the initial depth A using the equation $$\mu = \frac{\rho_{f,A} V^2_{f,A}}{V^2_{f,A}/V^2_{ST,A} - 1}, \tag{51}$$

where $\rho_{f,A}$ is the mud density at depth A; and $V_{f,A}$, and $V_{ST,A}$ are the mud compressional velocity and Stoneley velocity at depth A, respectively.

5b. Solving the velocity difference equations includes estimating compressional modulus $(\lambda + 2\mu)$ from the formation compressional velocity at depth A using the equation $$\lambda + 2\mu = \rho_{b,A} V^2_{C,A}. \tag{52}$$

5c. Solving the velocity difference equations includes calculating Young's modulus and Poisson's ratio from the Lame parameters ($\lambda$ and $\mu$) or the compressional and shear velocities in the chosen isotropic reference state.

5d. Solving the velocity difference equations includes estimating effective vertical stress $\Delta\sigma_V$ from the overburden stress, pore pressure gradient, and the Biot parameter $\alpha$.

5e. Solving the velocity difference equations includes estimating effective maximum horizontal stress $\Delta\sigma_H$ from the hydrofrac tests or wellbore breakouts, pore pressure gradient and the Biot parameter.

6. Solving for minimum horizontal stress at a given depth A within the selected depth interval includes calculating effective minimum horizontal stress at depth A using the equation $$\sigma_{h,A} = \frac{\rho_{b,A}(V^2_{FS,A} - V^2_{SS,A})}{(1 - \nu)(2\mu + C_{155} - C_{144})/Y} + \sigma_{H,A}, \tag{53}$$

and calculating the total minimum horizontal stress using the equation $$S_{h,A} = \sigma_{h,A} + \alpha P_{p,A}, \tag{54}$$

where $P_{P,A}$ is the pore pressure at depth A, and $\alpha$ is the Biot parameter.

Determining Pore Pressure Gradient

The third version of the first embodiment of the method is a procedure for determining pore pressure gradient $\Delta P_P$ using inversion of velocity difference equations. This embodiment is useful when maximum horizontal stress $S_{H\ max}$ and minimum horizontal stress $S_{h\ min}$ as a function of depth are known from other sources. Maximum horizontal stress $S_{H\ max}$ and minimum horizontal stress $S_{h\ min}$ can be determined from hydrofrac tests and wellbore breakout analyses.

In the third version of the first embodiment, the method includes the following steps:

1. Selecting a depth interval AB of the borehole as illustrated in FIG. 1. "A" indicates the top of the depth interval. "B" indicates the bottom of the depth interval.

2. Calculating the overburden stress difference $\Delta S_V$ over the depth interval AB by integrating formation mass density using equation $$\Delta S_V = \int_B^A \rho_b g \, dh, \tag{55}$$

where $\rho_b$ is the formation bulk density and g is the acceleration due to gravity.

3. Calculating the effective vertical stress difference $\Delta \sigma_v$ using the equation $$\Delta \sigma_v = \Delta S_V - \alpha \Delta P_P, \tag{56}$$

where $\alpha$ is the Biot parameter for a porous formation, and $\Delta P_P$ is the pore pressure difference over the selected depth interval AB. Equation (57) is evaluated by estimating maximum horizontal stress change $\Delta S_H$ and minimum horizontal stress change $\Delta S_h$ over the selected depth interval AB based on data from hydrofrac tests in neighboring offset wells, and then using these estimates in the equations $$\Delta \sigma_h = \Delta S_H - \alpha \Delta P_P,$$

$$\Delta \sigma_h = \Delta S_h - \alpha \Delta P_P,$$

$$\Delta \sigma_H + \Delta \sigma_h = \Delta S_H + \Delta S_h - 2\alpha P_P. \tag{57}$$

4. Solving a set of first, second, third and fourth velocity difference equations to determine fluid pore pressure difference $\Delta P_P$.

Solving the velocity difference equations includes inserting into the equations (a) estimated values of vertical stress, maximum horizontal stress, and minimum horizontal stress, (b) estimated values of linear constants (two independent linear constants selected from Young's modulus, Poisson's ratio and the two Lame constants), (c) measured values of two physical parameters (depth and mass density), and (d) measured values of compressional, fast shear, slow shear, and Stoneley velocities between the depths A and B. It also includes solving the set of velocity difference equations by inversion.

Equations 58–61 below are combined with equations 62–65 to eliminate $\Delta C_{33}$, $\Delta C_{44}$, $\Delta C_{55}$ and $\Delta C_{66}$ to produce the velocity difference equations. The resulting velocity difference equations are solved by inversion for four unknowns: pore pressure difference $\Delta P_P$ and the three nonlinear constants $C_{111}$, $C_{144}$, and $C_{155}$. Note that $\Delta P_P$ is the difference between the pore pressure at depth B and the pore pressure at depth A. The equations are solved using a commercially available computer program configured to execute a least squares minimization program.

Equations 58–61 express the four effective stiffnesses $C_{33}$, $C_{44}$, $C_{55}$ and $C_{66}$ (for compressional, fast shear, slow shear and Stoneley waves, respectively) in terms of velocity difference as follows $$\Delta C_{33} = \rho_B V^2_{C,B} - \rho_A V^2_{C,A}, \tag{58}$$

$$\Delta C_{44} = \rho_B V^2_{SS,B} - \rho_A V^2_{SS,A}, \tag{59}$$

$$\Delta C_{55} = \rho_B V^2_{FS,B} - \rho_A V^2_{FS,A}, \tag{60}$$

$$\Delta C_{66} = \frac{\rho_{f,B} V^2_{f,B}}{(V^2_{f,B}/V^2_{ST,B} - 1)} - \frac{\rho_{f,A} V^2_{f,A}}{(V^2_{f,A}/V^2_{ST,A} - 1)}, \tag{61}$$

where $\rho_A$ and $\rho_B$ are the formation mass density at depths A and B, respectively; $\rho_{f,A}$ and $\rho_{f,B}$ are the mud density at depths A and B, respectively. $V_C$, $V_{FS}$, $V_{SS}$ and $V_{ST}$ are the compressional, fast shear, slow shear and Stoneley velocities, respectively.

Equations 62–65 express the four above-mentioned effective stiffnesses $\Delta C_{33}$, $\Delta C_{44}$, $\Delta C_{55}$ and $\Delta C_{66}$ in terms of changes in the effective vertical stress ($\Delta \sigma_V$), maximum horizontal stress ($\Delta \sigma_H$), minimum horizontal stress ($\Delta \sigma_h$), and the three independent formation nonlinear constants $C_{111}$, $C_{144}$ and $C_{155}$ as follows $$\Delta C_{33} = \left[1 + \frac{(3+2\nu)(\lambda+2\mu)}{Y}\right]\Delta \sigma_V - \tag{62}$$
$$\frac{(1+2\nu)(\lambda+2\mu)}{Y}(\Delta \sigma_H + \Delta \sigma_h) +$$
$$\frac{C_{111}}{\mu}\left[\frac{(1-2\nu)\mu}{Y}(\Delta \sigma_H + \Delta \sigma_h) + \frac{(1-2\nu)\mu}{Y}\cdot \Delta \sigma_V\right] -$$
$$4\frac{C_{155}}{\mu}\left[\frac{(1-\nu)\mu}{Y}(\Delta \sigma_H + \Delta \sigma_h) - \frac{2\nu\mu}{Y}\cdot \Delta \sigma_V\right],$$

$$\Delta C_{44} = \left(1 + \frac{\mu}{Y}\right)\Delta \sigma_V + \frac{\mu}{Y}\Delta \sigma_h - \frac{(1+2\nu)\mu}{Y}\Delta \sigma_H + \tag{63}$$
$$\frac{C_{144}}{\mu}\left[\frac{\mu}{Y}\Delta \sigma_H - \frac{\nu\mu}{Y}(\Delta \sigma_h + \Delta \sigma_V)\right] +$$
$$\frac{C_{155}}{\mu}\left[-\frac{2\nu\mu}{Y}\Delta \sigma_H + \frac{(1-\nu)\mu}{Y}(\Delta \sigma_h + \Delta \sigma_V)\right],$$

$$\Delta C_{55} = \left(1 + \frac{\mu}{Y}\right)\Delta \sigma_V + \frac{\mu}{Y}\Delta \sigma_H - \frac{(1+2\nu)}{Y}\Delta \sigma_h + \tag{64}$$
$$\frac{C_{144}}{\mu}\left[\frac{\mu}{Y}\Delta \sigma_h - \frac{\nu\mu}{Y}(\Delta \sigma_H + \Delta \sigma_V)\right] +$$
$$\frac{C_{155}}{\mu}\left[-\frac{2\nu\mu}{Y}\Delta \sigma_h + \frac{(1-\nu)\mu}{Y}(\Delta \sigma_H + \Delta \sigma_V)\right],$$

$$\Delta C_{66} = \left(\frac{1}{2} + \frac{\mu}{Y}\right)(\Delta \sigma_H + \Delta \sigma_h) - \frac{(1+2\nu)\mu}{Y}\Delta \sigma_V + \tag{65}$$
$$\frac{C_{144}}{\mu}\left[\frac{\mu}{Y}\Delta \sigma_V + \frac{-\nu\mu}{Y}(\Delta \sigma_H + \Delta \sigma_h)\right] +$$
$$\frac{C_{155}}{\mu}\left[-\frac{2\nu\mu}{Y}\Delta \sigma_V + \frac{(1-\nu)\mu}{Y}(\Delta \sigma_H + \Delta \sigma_h)\right],$$

where Y, $\nu$ and $\mu$ are the Young's modulus, Poisson's ratio, and shear modulus of the formation referred to a selected isotropic reference state at the initial depth A.

4a. Solving the velocity difference equations includes estimating shear modulus $\mu$ in the reference state from the measured Stoneley velocity value at the initial depth A using the equation $$\mu = \frac{\rho_{f,A} V^2_{f,A}}{V^2_{f,A}/V^2_{ST,A} - 1}, \tag{66}$$

where $\rho_{f,A}$ is the mud density at depth A; and $V_{f,A}$, and $V_{ST,A}$ are the mud compressional velocity and Stoneley velocity at depth A, respectively.

4b. Solving the velocity difference equations includes estimating compressional modulus ($\lambda + 2\mu$) from the formation compressional velocity at depth A using the equation $$\lambda + 2\mu = \rho_{b,A} V^2_{C,A}. \tag{67}$$

4c. Solving the velocity difference equations includes calculating Young's modulus Y and Poisson's ratio $\nu$ from the Lame parameters ($\lambda$ and $\mu$) or from the compressional and shear velocities in the chosen isotropic reference state.

4d. Solving the velocity difference equations includes estimating effective vertical stress $\Delta\sigma_V$ from the overburden stress and the Biot parameter $\alpha$.

4e. Solving the velocity difference equations includes estimating effective minimum horizontal stress $\Delta\sigma_h$ and maximum horizontal stress $\Delta\sigma_H$ from the hydrofrac tests or wellbore breakouts and the Biot parameter.

5. Calculating pore pressure gradient at the selected depth interval using the equation $$PoreFluidPressureGradient = \frac{\Delta P_P}{BA}. \tag{68}$$

Estimating Minimum Horizontal Stress Gradient

The fourth version of the first embodiment is a procedure for determining minimum horizontal stress gradient $\Delta S_{h\,min}$ using inversion of velocity difference equations. If the overburden stress, pore pressure, and maximum horizontal stress gradients can be obtained from other sources, they can be used as input to the four velocity-difference equations to estimate the three formation nonlinear constants and a vertical depth gradient in the minimum horizontal stress magnitude.

Estimating Pore Pressure Gradient

The fifth version of the first embodiment is a procedure for determining pore pressure gradient $\Delta P_P$ using inversion of velocity difference equations. If the overburden stress, maximum horizontal stress, and minimum horizontal stress gradients can be obtained from other sources, they can be used as input to the four velocity-difference equations to estimate the three formation nonlinear constants and a vertical depth gradient in the pore pressure.

Determining Pore Pressure Change over Time

Figure 4:
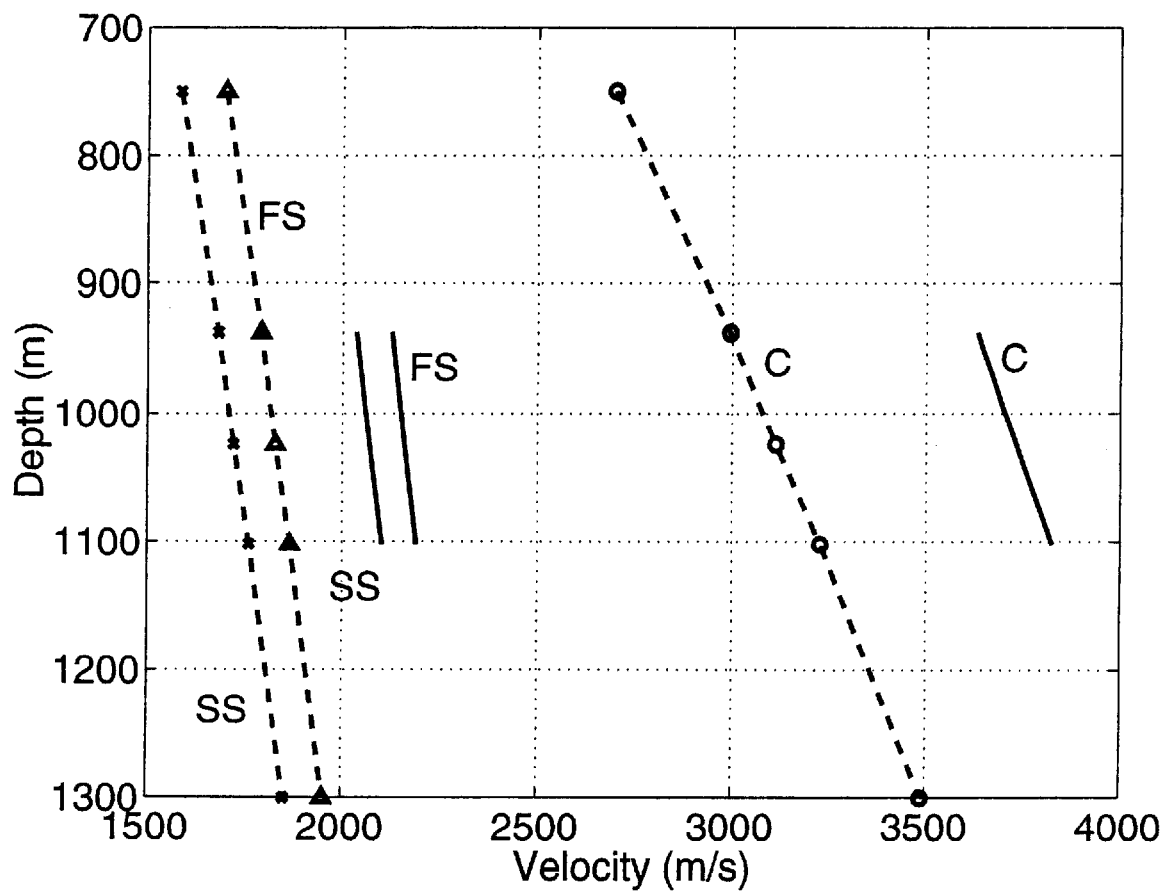
FIG. 4 is a graph showing compressional, fast shear, slow shear, and Stoneley velocities before and after a period of hydrocarbon production.

During a period of hydrocarbon production from a reservoir, the reservoir becomes depleted and the pore pressure decreases from an initial value. However, the total formation stresses in the far-field do not change. Accordingly, as the pore pressure decreases, the three effective principal stresses increase. FIG. 4 shows the velocity logs of compressional C, fast shear FS, slow shear SS in a reservoir before (dashed line) and after (solid line) hydrocarbon production.

The second embodiment of the method is a procedure for calculating changes in the pore pressure from time-lapse measurements. The first version of the second embodiment includes the following steps:

1. Selecting a depth interval of the borehole.
2. Measuring the formation mass density and compressional velocity at times t1 (before production) and t2 (after production).
3. Calculating the change in the effective stiffness $\Delta C_{33}$ at a given depth using the equation $$\Delta C_{33} = \rho_{D,t2} V^2_{C,D,t2} - \rho^2_{C,D,t1}, \tag{69}$$

where the index C denotes the compressional velocity and the index D denotes any selected depth within the depth interval AB, and using equation (70) below.

The measured change in the effective stiffness $\Delta C_{33}$ is related to the formation parameters shown in equation (32). Since the total formation stresses do not change, changes in the effective stresses can be replaced by a pore pressure change in equation (32) and the resulting equation describing the change in the effective stiffness and pore pressure change is given by the equation $$\Delta C_{33} = \left[1 + \frac{(1-2\upsilon)(\lambda + 2\mu)}{Y} + \left(3\frac{C_{111}}{\mu} - 8\frac{C_{155}}{\mu}\right)\frac{(1-2\upsilon)\mu}{Y}\right]\alpha\Delta P_P, \tag{70}$$

$$= [C_{P,C}]\alpha\Delta P_P,$$

where $\Delta P_P = P_{P,t1} - P_{P,t2}$, is change in the pore pressure at a selected depth; $\alpha$ is the Biot Parameter obtained from other sources; and $C_{P,C}$ is the pore-pressure coefficient of compressional (C) velocity. The quantities defining $C_{P,C}$ are determined from a calibration at initial time t1 as described in steps 1–5 above (under the heading "Method for Determining Stress Parameters in a Formation around a Borehole, Maximum Horizontal Stress").

4. Calculating pore pressure using the equation $$\alpha\Delta P_P = (\rho^{D,t2} V_{C,D,t2}^2 - \rho_{D,t1} V^2_{C,D,t1})/C_{P,C}, \tag{71}$$

where $C_{P,C}$ is defined by equation (70).

In a second version of the second embodiment, change in the pore pressure at a selected depth is determined from the measured change in the fast-shear velocity $V_{FS}$ using the equation $$\alpha\Delta P_P = (\rho^{D,t2} V_{FS,D,t2}^2 - \rho_{D,t1} V^2_{FS,D,t1})/C_{P,FS}, \tag{72}$$

where $C_{P,FS}$ is defined by $$[\Delta C_{P,FS}] = \left[1 + \frac{(1-2\upsilon)\mu}{Y} + \left(\frac{C_{144}}{\mu} + 2\frac{C_{155}}{\mu}\right)\frac{(1-2\upsilon)\mu}{Y}\right]. \tag{73}$$

In a third version of the second embodiment, change in the pore pressure at a selected depth is determined from the measured change in the slow-shear velocity $V_{SS}$ using the equation $$\alpha\Delta P_P = (\rho^{D,t2} V_{SS,D,t2}^2 - \rho_{D,t1} V^2_{SS,D,t1})/C_{P,SS}, \tag{74}$$

where $C_{P,SS} = C_{P,FS}$, defined by equation (73).

Determining Pore Fluid Overpressure in Overpressured Shales

Figure 5:
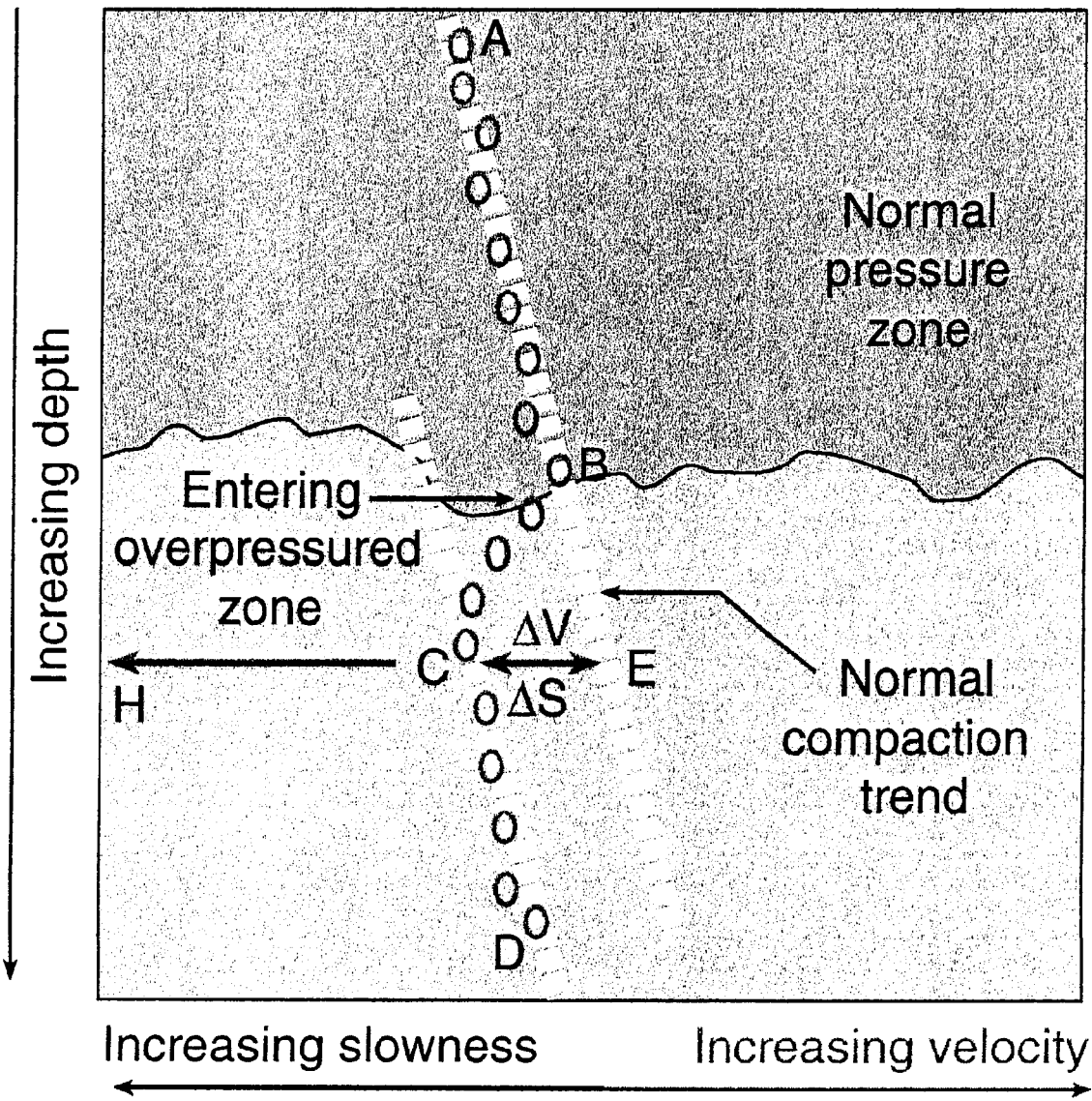
FIG. 5 is a schematic representation of compressional velocities across the interface between a normal compacted zone and an overpressure zone.

A third embodiment of the method is a procedure for determining pore fluid overpressure in an overpressured shale formation. "Pore fluid overpressure" is the difference in pressure between pore fluid pressure in an overpressured shale formation and pore pressure in a normally compacted zone. FIG. 5 is a schematic diagram of a compressional velocity log in a normally compacted zone and in an overpressured zone immediately below the normally compacted zone. The data show increasing compressional velocity with depth within each zone. See line AB in the normal pressure zone and line CD in the overpressure zone. Decrease in velocity at depth H can be used to estimate the increase in overpressure. In the seventh embodiment the method included the following steps:

1. Selecting a depth interval AB.
2. Measuring compressional velocity within the depth interval to produce measured compressional velocity values $V_C$.
3. Calculating the change in the effective stiffness $\Delta C_{33}$ over a selected depth interval AB in a normally compacted zone from formation density compressional velocity values logs as given by the equation $$\Delta C_{33} = \rho_B V_{C,B}^2 - \rho_A V_{C,A}^2, \tag{75}$$

where the indices A and B denote that the quantity is defined at depths A and B, respectively. 4. Estimating the Biot parameter in a normally compacted zone $\alpha_n$, the Biot parameter in the overpressured zone $\alpha_0$, and the change in pore pressure $\Delta P_P$ over the selected depth interval AB. If the horizontal stresses are approximately uniform over both the normally compacted and overpressured zones, the change in the effective stiffness $\Delta C_{33}$ is related by calibrating the measured compressional velocity as a function of effective vertical stress in a nearby offset well to a corresponding change in the vertical effective stress $\Delta \sigma_V$ and formation linear and nonlinear parameters by the equation $$\Delta C_{33} = \left[1 + \frac{(3+2\upsilon)(\lambda+2\mu)}{Y} + \frac{(1-2\upsilon)C_{111}}{Y} + \frac{8\upsilon C_{155}}{Y}\right]\Delta\sigma_V, \quad (76)$$

where $$\Delta\sigma_V = \Delta S_V - \alpha_n \Delta P_P \quad (77)$$

$$\Delta S_V = \int_B^A \rho_b(z)g dz \quad (78)$$

where $\alpha_n$ is the Biot parameter in a normally compacted zone, and $\Delta P_P$ is the change in pore pressure over the selected depth interval AB.

5. Calculating the vertical effective stress coefficient of compressional velocity from the relation $$C_{VS,C} = \left[1 + \frac{(3+2\upsilon)(\lambda+2\mu)}{Y} + \frac{(1-2\upsilon)C_{111}}{Y} + 8\frac{\upsilon C_{155}}{Y}\right], \quad (79)$$

$$= \frac{\rho_B V_{C,B}^2 - \rho_A V_{C,A}^2}{\Delta\sigma_V}.$$

6. Calculating, at a selected depth X in the overpressured zone, the change in the effective stiffness $\Delta C_{33}$ from the mass density, measured compressional velocity an extrapolated velocity from the normal compaction trend $$\Delta C_{33} = \rho_X V_{C,X,e} - \rho_X V_{C,X,m}. \quad (80)$$

where the subscript C denotes compressional velocity; the subscripts e and m denote extrapolated from the normal trend and measured velocities in the overpressured zone.

7. Calculating the change in the effective vertical stress that would cause the measured deviation from the normal trend in the compressional velocity using the equation $$\Delta\sigma_V = \frac{\rho_X V_{C,X,e}^2 - \rho_X V_{C,X,m}^2}{C_{VS,C}}, \quad (81)$$

where $$\Delta\sigma_V = \alpha_0 \Delta P_P, \quad (82)$$

since $\Delta S_V = 0$, at the selected depth X of interest.

8. Calculating overpressure $\Delta P_P$ using the equation $$\Delta P_P = \frac{\Delta\sigma_V}{\alpha_0}. \quad (83)$$

What is claimed is:

1. A method for determining an unknown stress parameter of an earth formation proximate to a borehole in the formation at a given depth, the method comprising:
    a) measuring a first set of parameters of the borehole within a selected depth interval of the borehole to produce a first set of measured values, the first set of parameters including compressional velocity, fast-shear velocity, slow-shear velocity and Stoneley velocity;
    b) estimating a second set of parameters of the formation to produce estimated values; and
    c) solving a set of first, second, third, and fourth velocity difference equations to determine the unknown stress parameter at a depth within the depth interval using the measured values and the estimated values.

2. A method according to claim 1, wherein the first equation includes a compressional velocity term, the second equation includes a fast-shear velocity term, the third equation includes a slow-shear velocity term, and the fourth equation includes a Stoneley velocity term.

3. A method according to claim 2, wherein solving the set of velocity difference equations includes executing a least squares minimization program.

4. A method according to claim 2, further comprising:
    d) solving a fifth equation to determine the unknown stress parameter at a given depth within the depth interval.

5. A method according to claim 4, wherein the unknown stress parameter is total maximum horizontal stress at the given depth, and the fifth equation includes the Biot parameter to collect for porosity, pore shape and connectivity of the formation within the depth interval.

6. A method according to claim 4, wherein the unknown stress parameter is total minimum horizontal stress at the given depth, and the fifth equation includes the Biot parameter to correct for porosity, pore shape and connectivity of the formation within the depth interval.

7. A method according to claim 4, wherein the unknown stress parameter is pore pressure gradient at the given depth, and solving the fifth equation includes dividing pore pressure difference across the selected depth interval by the depth of the depth interval.

8. A method according to claim 1, wherein the unknown stress parameter is minimum horizontal stress gradient at the given depth, and the estimated values include overburden stress, pore pressure, and maximum horizontal stress gradient.

9. A method according to claim 1, wherein the unknown stress parameter is pore pressure gradient at the given depth, and the estimated values include overburden stress, maximum horizontal stress gradient, and minimum horizontal stress gradient.

10. A method for determining a difference in pore pressure at a given depth in an earth formation proximate to a borehole, before and after a production period, the method comprising:
    a) measuring a first set of parameters of the formation within a selected depth interval of the borehole before the production period to produce a first set of measured values measured within the depth interval, the set of parameters including one of a group of velocities, the group consisting of compressional velocity, fast-shear velocity and slow-shear velocity;

b) measuring the first set of parameters within the selected depth interval after the production period to produce a second set of measured values measured within the depth interval;

c) estimating a second set of parameters of the formation to produce estimated values;

d) solving a set of first, second, third, and fourth velocity difference equations to determine unknown stress parameters at a depth within the depth interval using the first and second sets of measured values and the estimated values; and e) solving a fifth equation to determine difference in pore pressure.

11. A method according to claim 10, wherein the first set of measured values are compressional velocity values, and solving the fifth equation includes solving an equation involving linear and non-linear stress coefficients.

12. A method according to claim 10, wherein the first set of measured values are fast-shear velocity values, and solving the fifth equation includes solving an equation involving linear and non-lineal stress coefficients.

13. A method according to claim 10, wherein the first set of measured values are slow-shear velocity values, and solving the fifth equation includes solving an equation involving linear and non-linear stress coefficients.

14. A method for determining pore fluid overpressure of an overpressured shale formation at a given depth in an earth formation proximate to a borehole, the method comprising:

a) measuring compressional velocity of the formation within a selected depth interval of the borehole to produce a set of measured values;

b) estimating density and compression to produce estimated values;

c) calculating pore fluid overpressure by evaluating an expression involving the measured values and the estimated values, and the vertical effective stress coefficient of compressional velocity.

15. A method according to claim 14, wherein the calculating pore fluid overpressure includes calculating vertical effective stress coefficient of compressional velocity.

* * * * *